W. L. POLLOCK, Jr.
SAFETY SHUTTER CONTROLLER FOR CAMERAS.
APPLICATION FILED SEPT. 25, 1914.
1,131,160.                                                    Patented Mar. 9, 1915.
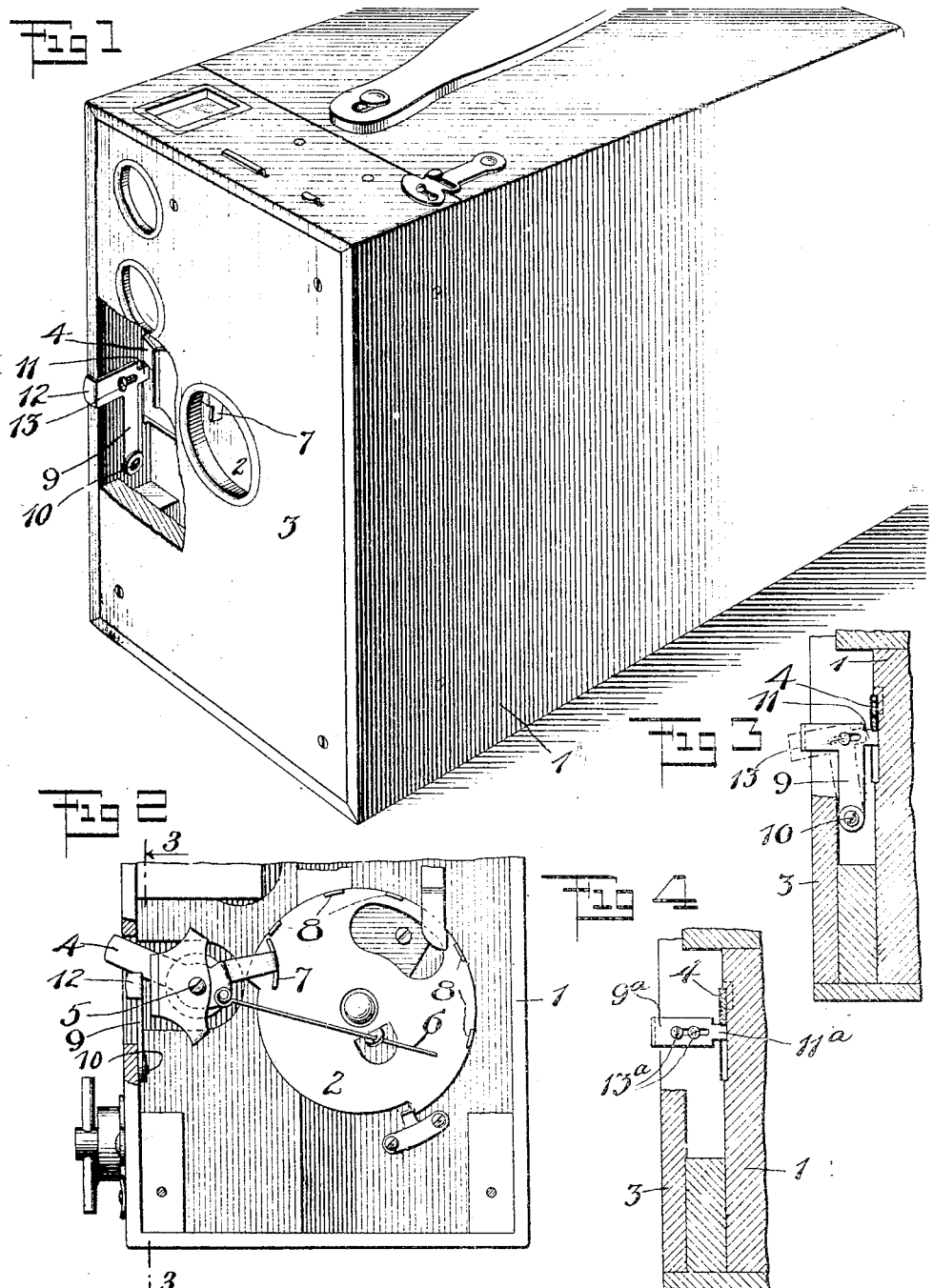

UNITED STATES PATENT OFFICE.

WILLIAM L. POLLOCK, JR., OF NEW YORK, N. Y.

SAFETY SHUTTER-CONTROLLER FOR CAMERAS.

1,131,160.   Specification of Letters Patent.   Patented Mar. 9, 1915.

Application filed September 25, 1914. Serial No. 863,418.

*To all whom it may concern:*

Be it known that I, WILLIAM L. POLLOCK, Jr., a citizen of the United States, residing at New York city, New York county, State of New York, (post-office address 3671 Broadway, New York, N. Y.,) have invented certain new and useful Improvements in Safety Shutter-Controllers for Cameras, of which the following is a full, clear, and exact description.

My invention relates to an improved safety device for cameras of the so-called "Brownie" type, wherein the shutter is manually operated by pushing a lever to and fro, the movement of the lever in either direction first putting the shutter spring under tension and then releasing the shutter so that it will move under the pressure of the spring. In such devices the shutter operating handle is exposed and may be accidentally moved so as to cause unintentional exposure of the film. It is my purpose to provide a simple and effective means for making this impossible.

In the drawings Figure 1 is a perspective view of the camera constructed with my improved safety device, said view being partly broken away. Fig. 2 is a front elevation with the cover at the shutter end removed, part of the camera being broken away. Fig. 3 is a section on the line 3—3, Fig. 2. Fig. 4 is a similar view of a modification.

1 represents the box of a camera of the so-called "Brownie" type.

2 represents a shutter which is housed in a recess in the front end, said recess being usually covered by a cover piece 3.

4 is a shutter operating lever which is pivoted at 5 within the camera, said shutter operating member carrying a spring 6, which is connected with the shutter, and a latch 7 which operates on stops 8—8 at the edge of the shutter, so that when the handle 4 is moved the shutter will be held stationary while the spring 6 is being put under tension, the last partial movement of the handle 4 releasing the shutter so that it will be turned under the tension of the spring 6. A reverse movement of the handle 4 operates on the shutter in the same way but in a reverse direction. Since the shutter operating handle 4 may be freely moved, it is liable to be accidentally struck and an unintentional exposure made. To prevent this I have provided a safety mechanism, two forms of which I have shown in my drawings. In the form illustrated in Figs. 1–3, the safety mechanism comprises a swinging latch member 9 pivoted at 10, within the box, and having at its free end a concealed locking nose 11 and an exposed finger-piece 12, the finger-piece projecting outside of the camera box so that the latch may be manually operated. 13 is a stop which passes through a slot in the latch and limits its movement. The nose 11 of the latch projects into the path of the swinging movement of the handle 4, so that when said handle stands in either of its extreme positions it cannot be moved until the latch is withdrawn,—that is to say, until the nose 11 is withdrawn from the path of movement of the lever 4.

In Fig. 4 I have shown a modification of the latch in which the same, instead of being hinged, is mounted for reciprocal movement being guided by two studs 13ª, 13ª which pass through a slot in the latch 9ª so as to perform the double function of guides and stops to limit the movement. The action, so far as engaging the lever 4, is the same as in that form shown in Figs. 1–3, said latch having its inner end 11ª adapted to block the accidental movement of the shutter operating handle 4. By this very simple expedient the users of such cameras are guaranteed against accidental exposure of the photographic plate or sensitized film, as the case may be.

The several pivots and stops for the safety device may be in the form of screws whereby the same may be tightened to put suitable friction on the safety latch to prevent its accidental displacement.

What I claim is,—

1. In a camera of the character described, a shutter, a shutter operating device arranged to be moved to and fro and to operate the shutter on both movements, and manually operable means carried by the camera to hold said shutter operating device against accidental movement in either direction, said means comprising a movable latch located within the camera adjacent to the shutter operating handle and arranged to be moved into and out of the path of movement of said operating device, said latch having an exposed finger piece.

2. In a camera of the character described, a shutter, a shutter operating device arranged to be moved to and fro and to operate the shutter on both movements, and manually operable means carried by the camera to hold said shutter operating device against accidental movement in either direction, said means comprising a movable latch located within the camera adjacent to the shutter operating device and arranged to be moved into and out of the path of movement of said operating device, said latch having a swinging movement, said latch having an exposed finger piece.

WILLIAM L. POLLOCK, Jr.

Witnesses:
 HENDERSON F. HILL,
 R. C. MITCHELL.